United States Patent
Zhang et al.

(10) Patent No.: US 11,463,137 B1
(45) Date of Patent: Oct. 4, 2022

(54) SPATIAL STREAM CONFIGURATION ENCODING FOR WIFI

(71) Applicant: Marvell Asia Pte, Ltd., Singapore (SG)

(72) Inventors: Yan Zhang, Palo Alto, CA (US); Rui Cao, Sunnyvale, CA (US); Bo Yu, San Jose, CA (US); Hongyuan Zhang, Fremont, CA (US); Liwen Chu, San Ramon, CA (US)

(73) Assignee: Marvell Asia Pte Ltd, Singapore (SG)

( * ) Notice: Subject to any disclaimer, the term of this patent is extended or adjusted under 35 U.S.C. 154(b) by 192 days.

(21) Appl. No.: 16/889,769

(22) Filed: Jun. 1, 2020

Related U.S. Application Data

(60) Provisional application No. 62/854,802, filed on May 30, 2019.

(51) Int. Cl.
*H04B 7/0452* (2017.01)
*H04L 5/00* (2006.01)
(Continued)

(52) U.S. Cl.
CPC ......... *H04B 7/0452* (2013.01); *H04L 5/0007* (2013.01); *H04L 5/0053* (2013.01); *H04L 27/2602* (2013.01); *H04W 84/12* (2013.01)

(58) Field of Classification Search
CPC ... H04B 7/0452; H04L 5/0007; H04L 5/0053; H04L 27/2602; H04W 84/12
See application file for complete search history.

(56) References Cited

U.S. PATENT DOCUMENTS

2011/0255620 A1  10/2011  Jones, IV et al.
2015/0131517 A1  5/2015  Chu et al.
(Continued)

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

(Continued)

*Primary Examiner* — Mohammad S Anwar

(57) ABSTRACT

In an embodiment, a method is for communicating in a wireless local area network (WLAN) that utilizes multi-user multiple input, multiple output (MU-MIMO). A first communication device determines an allocation of spatial streams for multiple second communication devices that are intended receivers of an multi-user multiple input, multiple output (MU-MIMO) transmission by the first communication device. The first communication device generates a subfield that indicates respective numbers of spatial streams allocated to respective second communication devices, the generating the subfield performed according to an encoding that supports allocating up to sixteen spatial streams to up to eight intended receivers. The first communication device generates a multi-user physical layer (PHY) data unit that includes i) a PHY preamble, and ii) a PHY data portion. The PHY preamble is generated to include the subfield, and the PHY data portion is generated to include the MU-MIMO transmission.

20 Claims, 4 Drawing Sheets

(51) Int. Cl.
*H04W 84/12* (2009.01)
*H04L 27/26* (2006.01)

(56) References Cited

U.S. PATENT DOCUMENTS

| | | | | |
|---|---|---|---|---|
| 2016/0204898 A1* | 7/2016 | Ghosh | ............ | H04B 7/0413 370/329 |
| 2018/0145733 A1* | 5/2018 | Verma | ............ | H04L 5/0091 |
| 2019/0373586 A1* | 12/2019 | Verma | ............ | H04B 7/0697 |

OTHER PUBLICATIONS

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Kwon et al., "SIG Field Design Principle for 11ax," Newracon, doc. IEEE 802.11-15/0344r2, Mar. 2015, 18 pages.

Kwon et al., "SIG Structure for UL PPDU," IEEE Draft, doc. IEEE 802.11-15/0574r0, vol. 802.11ax, 18 pages (May 11, 2015).

Seok et al., "HEW PPDU Format for Supporting MIMO-OFDMA," IEEE 802.11-14/1210r0, 16 pages, (Sep. 14, 2014).

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhang et al., "EHT Technology Candidate Discussions," doc: IEEE 802.11-18/1161r0, *The Institute of Electrical and Electronics Engineers, Inc.*, pp. 1-10 Jul. 8, 2018.

* cited by examiner

SPATIAL STREAM CONFIGURATION ENCODING FOR WIFI

CROSS REFERENCES TO RELATED APPLICATIONS

This application claims the benefit of U.S. Provisional Patent Application No. 62/854,802, entitled "Spatial Configuration Subfield Encoding Format (HE-SIGB Preamble User Field)," filed on May 30, 2019, which is incorporated herein by reference in its entirety.

FIELD OF TECHNOLOGY

The present disclosure relates generally to wireless communication systems, and more particularly to multi-user transmissions using multiple spatial streams in a wireless local area network (WLAN).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by simultaneously transmitting independent data streams via different spatial streams. For example, the IEEE 802.11ax Standard permits simultaneous transmissions via up to eight spatial streams to up to eight client stations. Work has now begun on a new iteration of the IEEE 802.11 Standard, which is referred to as the IEEE 802.11be Standard, or Extremely High Throughput (EHT) WLAN. The IEEE 802.11be Standard may permit simultaneous transmissions via up to sixteen (or perhaps even more) spatial streams to up to eight (or perhaps even more) client stations.

SUMMARY

In an embodiment, a method is for communicating in a wireless local area network (WLAN) that utilizes multi-user multiple input, multiple output (MU-MIMO). The method includes: determining, at a first communication device, an allocation of spatial streams for a plurality of second communication devices that are intended receivers of an MU-MIMO transmission by the first communication device; generating, at the first communication device, a subfield that indicates respective numbers of spatial streams allocated to respective second communication devices among the plurality of second communication devices, wherein generating the subfield is performed according to an encoding that supports allocating up to sixteen spatial streams to up to eight intended receivers, and wherein the subfield is generated to consist of six or fewer bits; and generating, at the first communication device, a multi-user physical layer (PHY) data unit that includes i) a PHY preamble, and ii) the MU-MIMO transmission, including: generating the PHY preamble to include the subfield, and generating a PHY data portion that includes the MU-MIMO transmission. The method further includes transmitting, by the first communication device, the PHY data unit.

In another embodiment, a first communication device comprises a wireless network interface device that is configured to communicate in a WLAN using MU-MIMO. The wireless network interface device comprises one or more integrated circuit (IC) devices configured to: determine an allocation of spatial streams for a plurality of second communication devices that are intended receivers of an MU-MIMO transmission by the first communication device; and generate a subfield that indicates respective numbers of spatial streams allocated to respective second communication devices among the plurality of second communication devices, wherein generating the subfield is performed according to an encoding that supports allocating up to sixteen spatial streams to up to eight intended receivers, and wherein the subfield is generated to consist of six or fewer bits. The one or more IC devices are further configured to generate a multi-user PHY data unit that includes i) a PHY preamble, and ii) the MU-MIMO transmission, including: generating the PHY preamble to include the subfield, and generating a PHY data portion that includes the MU-MIMO transmission. The one or more IC devices are further configured to control the wireless network interface device to transmit the PHY data unit.

DETAILED DESCRIPTION

Figure 1:
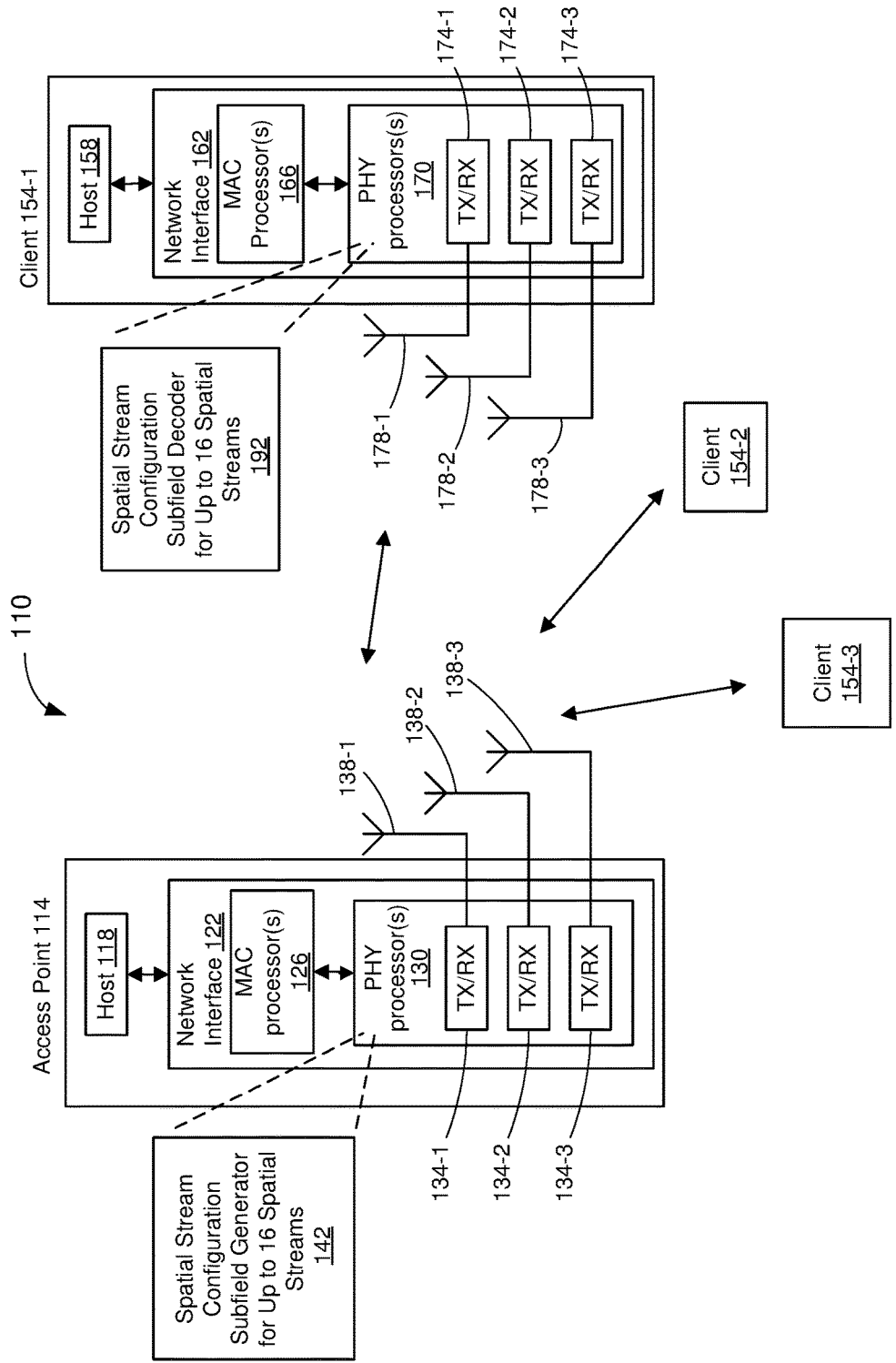
FIG. 1 is a block diagram of an example communication system in which an access point (AP) can simultaneously transmit via up to sixteen spatial streams to up to eight client stations in a downlink (DL) multi-user (MU) physical layer (PHY) data unit or packet using multiple input, multiple output (MU-MIMO) techniques, according to an embodiment.

The IEEE 802.11ax Standard permits an access point (AP) to simultaneously transmit via up to eight spatial streams to up to eight client stations in a downlink (DL) multi-user (MU) physical layer (PHY) data unit or packet using multiple input, multiple output (MU-MIMO) techniques. The DL MU packet may use MU-MIMO for all intended stations, or the DL MU packet may use a combination of orthogonal frequency division multiple access (OFDMA) and MU-MIMO, where MU-MIMO is only used in certain frequency segments or resource units (RUs). To inform client stations of how many spatial streams are allocated client stations in a DL MU packet, the DL MU packet includes, in a PHY preamble of the packet, spatial configuration subfields that indicate the spatial streams allocated to respective client stations that are receiving an MU-MIMO transmission. In particular, a respective spatial configuration subfield is included for each client station that is an intended receiver of an MU-MIMO transmission in the DL MU packet. The client station uses the spatial configuration subfield corresponding to the client station, along with other information in the PHY preamble, to determine how many spatial streams in DL MU packet have been allocated to the client station.

According to the IEEE 802.11ax Standard, each spatial configuration subfield consists of four bits, which is sufficient for indicating allocations of up to eight spatial streams to up to eight client stations.

A next generation wireless local area network (WLAN) protocol (e.g., the IEEE 802.11be Standard, sometimes referred to as the Extremely High Throughput (EHT) WLAN Standard) may permit simultaneous transmissions via up to sixteen (or perhaps even more) spatial streams to up to eight (or perhaps even more) client stations. The spatial configuration subfield of the IEEE 802.11ax Standard cannot be used for indicating allocations of up to sixteen spatial streams to up to eight client stations.

In various embodiments described below, example encodings of a spatial configuration subfield for a DL MU packet are described. The example encodings of the spatial configuration subfield are suitable for indicating allocations for the DL MU packet of up to sixteen spatial streams to up to eight client stations. In one embodiment, a respective spatial configuration subfield is included for each client station that is an intended receiver of an MU-MIMO transmission within the DL MU packet, and each spatial configuration subfield consists of six bits.

In other embodiments, example encodings of a spatial configuration subfield permit a spatial configuration subfield that consists of five bits or four bits to reduce transmission overhead for the DL MU packet. For instance, in one embodiment, a respective spatial configuration subfield is included for each client station that is an intended receiver of an MU-MIMO transmission within the DL MU packet, and each spatial configuration subfield consists of five bits. In another embodiment, a respective spatial configuration subfield is included for each client station that is an intended receiver of an MU-MIMO transmission within the DL MU packet, and each spatial configuration subfield consists of four bits.

FIG. 1 is a diagram of an example WLAN 110 that uses DL MU packets that employ MU-MIMO, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 comprises at least sixteen antennas 138 to support transmission of up to 16 spatial streams, as being considered for the IEEE 802.11be Standard, according to an embodiment. the AP 114 includes other suitable numbers of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to simultaneously communicate via multiple communication links in respective frequency segments within a single RF band, and/or to communicate via the multiple communication links at different times. In another embodiment, the wireless network interface device 122 is additionally configured for operation within two or more RF bands at the same time or at different times. For instance, in an embodiment, the wireless network interface device 122 is configured to the wireless network interface device 122 is configured to simultaneously communicate via multiple communication links in respective RF bands, and/or to communicate via the multiple communication links at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed circuit board (PCB), for example, or another suitable substrate, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to determine when the respective communication links are idle and available for transmission and to control the PHY processor 130 so that MAC layer data units are transmitted when respective communication links are idle, in some embodiments. Additionally, the MAC processor 126 is configured to determine when client stations are in a sleep state and therefore unavailable to transmit or receive, in some embodiments. For example, the MAC processor 126 is configured to negotiate a schedule with a client station for when the client station is permitted to be in the sleep state and when the client station should be in a wake state and available to transmit to or receive from the AP 114, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The PHY processor 130 includes, or implements, a spatial configuration subfield generator 142 that is configured to generate spatial configuration subfields suitable for indicating spatial stream allocations for one or more MU-MIMO transmissions within a DL MU packet of up to sixteen spatial streams to up to eight client stations, according to some embodiments. When the AP 114 is to transmit a DL MU packet that utilizes MU-MIMO, the spatial configuration subfield generator 142 generates, for each client station that is an intended receiver of an MU-MIMO transmission within the DL MU packet, a spatial configuration subfield that indicates how many spatial stream(s) in the DL MU packet correspond to the client station, according to an embodiment. The spatial configuration subfields generated by the spatial configuration subfield generator 142 are included in a PHY preamble of the DL MU packet.

In an embodiment, the spatial configuration subfield generator 142 comprises hardware circuitry that is configured to generate spatial configuration subfields having encodings such as described below. In another embodiment, the spatial configuration subfield generator 142 is implemented by a processor executing machine readable instructions stored in a memory, where the machine readable instructions cause the processor to generate spatial configuration subfields having encodings such as described below.

In another embodiment, the MAC processor 126 includes, or implements, the spatial configuration subfield generator 142.

To support transmission of up to 16 spatial streams, as being considered for the IEEE 802.11be Standard, the PHY processor 130 comprises hardware components (e.g., amplifiers, modulators, RF transceivers, etc.) suitable for generating and transmitting up to 16 spatial streams, according to an embodiment. As an illustrative example, the PHY processor 130 comprises at least eight spatial stream parsers, according to an embodiment. As another illustrative example, the PHY processor 130 comprises four spatial stream parsers (of the at least eight spatial stream parsers) that are capable of parsing into up to four spatial streams, according to an embodiment. As another illustrative example, the PHY processor 130 comprises no more than three spatial stream parsers (of the at least eight spatial stream parsers) that are capable of parsing into up to four spatial streams, according to an embodiment. As another illustrative example, the PHY processor 130 comprises no more than two spatial stream parsers (of the at least eight spatial stream parsers) that are capable of parsing into up to four spatial streams, according to an embodiment. To support transmission of up to 16 spatial streams to up to eight client stations, the MAC processor 126 comprises suitable processing and throughput capability for providing data to the PHY processor 130 for up to eight client stations and that can be parsed by the PHY processor 130 into up to 16 spatial streams, according to an embodiment.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single PCB, for example, or another suitable substrate, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The PHY processor 170 includes, or implements, a spatial configuration subfield decoder 192 that is configured to decode a spatial configuration subfield that is suitable for indicating allocations for MU-MIMO transmission in a DL MU packet of up to sixteen spatial streams to up to eight client stations, according to some embodiments. When the client station receives a DL MU packet, the spatial configuration subfield decoder 192 decodes the spatial configuration subfield corresponding to the client station to determine how many spatial streams in the DL MU packet correspond to the client station, according to an embodiment.

In an embodiment, the spatial configuration subfield decoder 192 comprises hardware circuitry that is configured to decode a spatial configuration subfield having encodings such as described below. In another embodiment, the spatial configuration subfield decoder 192 is implemented by a processor executing machine readable instructions stored in a memory, where the machine readable instructions cause the processor to decode spatial configuration subfields having encodings such as described below.

In another embodiment, the MAC processor 166 includes, or implements, the spatial configuration subfield decoder 192.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
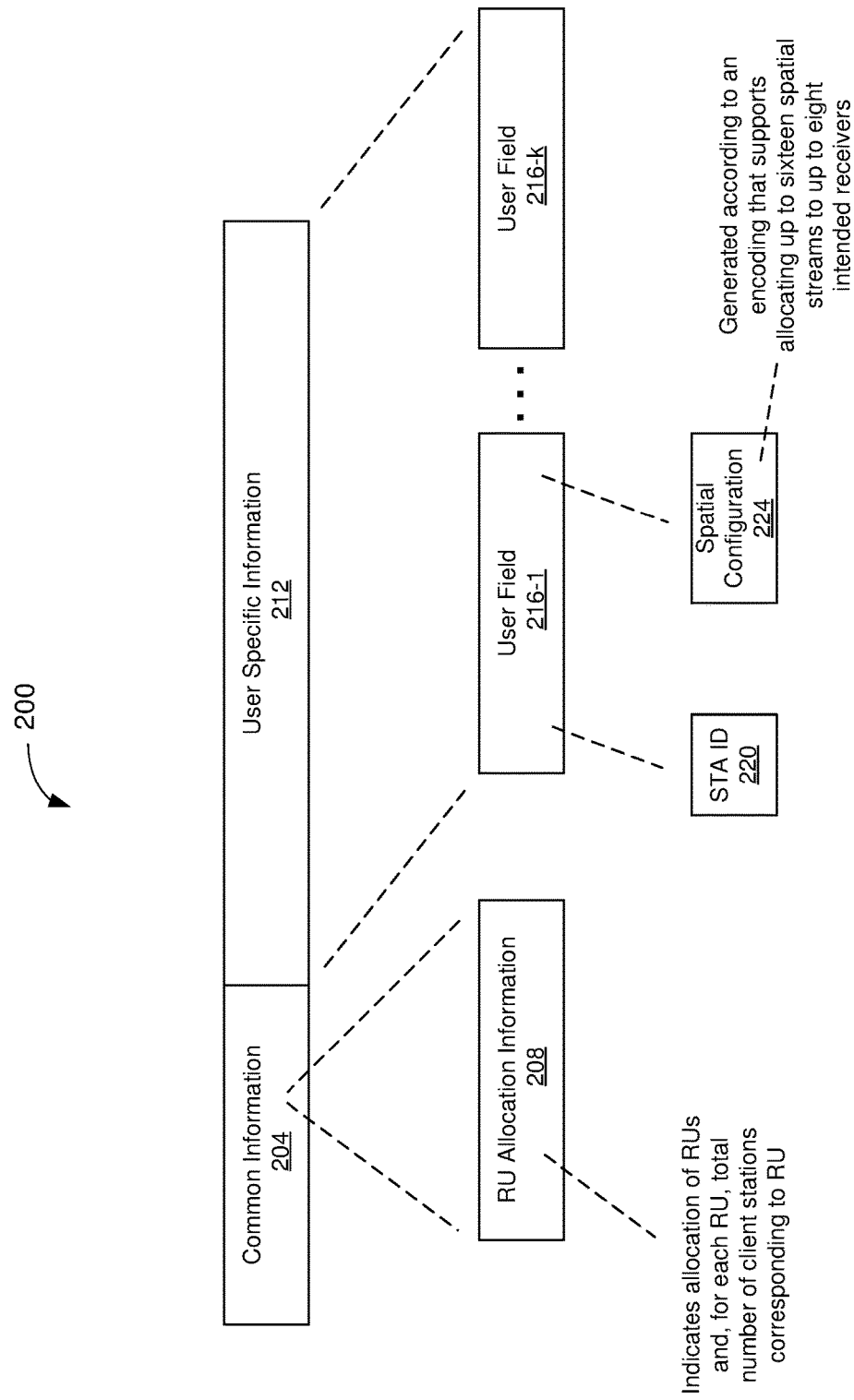
FIG. 2 is a diagram of an example portion of a PHY preamble included in a DL MU packet transmitted in the communication system of FIG. 1, according to an embodiment.

FIG. 2 is a diagram of an example portion 200 (referred to herein as the "signal field 200" for ease of explanation) of a PHY preamble included in a DL MU packet, according to an embodiment. The signal field 200 includes common information 204 regarding the DL MU packet that is common for all intended receivers of the DL MU packet. For example, the common information 204 includes RU allocation information 208 that indicates how frequency resources or frequency segments, e.g., RUs, are allocated within the DL MU packet, and how many client stations are allocated to each RU, according to an embodiment. If more than one client station is allocated to a single RU, this indicates to client stations that the RU corresponds to an MU-MIMO transmission, according to an embodiment.

The signal field 200 also includes user specific information 212 regarding the DL MU packet that is specific to individual receivers of the DL MU packet, according to an embodiment. For example, the user specific information 212 includes a respective user field 216 for each intended receiver of the DL MU packet, according to an embodiment. Each user field 216 includes a station identifier (STA ID) 220 that is an identifier of a particular client station and indicates the client station to which the user field 216 corresponds.

Additionally, at least when the client station is an intended receiver of an MU-MIMO transmission, the user field 216 includes a spatial configuration subfield 224. In some embodiments, when the client station is not an intended receiver of an MU-MIMO transmission, the user field 216 does not include the spatial configuration subfield 224. As will be described in more detail below, the spatial configuration subfield 224 indicates how many spatial streams correspond to the client station. In some embodiments, the spatial configuration subfield 224 consists of six bits. In other embodiments, the spatial configuration subfield 224 consists of five bits. In other embodiments, the spatial configuration subfield 224 consists of four bits.

The user fields 216 are arranged in an order, according to an embodiment. As will be described in more detail below, when a set of user fields 216 corresponds to a MU-MIMO transmission, a client station uses the order of user fields 216 to determine a position, within the set, of the user field 216 that corresponds to the client station, and uses the determined position, within the set, to decode the spatial configuration subfield 224, according to an embodiment.

Table 1 is an example encoding of a 6-bit spatial configuration subfield for an MU-MIMO transmission, according to an embodiment. The parameter Nuser (Number of Users) indicates a total number of client stations that are intended receivers of the MU-MIMO transmission. The parameter NSTS[x] (Number of Spatial Streams) indicates a number of spatial streams allocated to an x-th client station, where x indicates a position, within a set of user fields 216 corresponding to the MU-MIMO transmission, of a user field 216 that corresponds to a client station.

In the example encoding of Table 1, a maximum total number of client stations corresponding to a single MU-MIMO transmission is eight, i.e., Nuser≤8. In other embodiments, a maximum total number of client stations corresponding to a single MU-MIMO transmission is a suitable number more than eight, such as nine, ten, eleven, etc. Additionally, in the example encoding of Table 1, a client station can be allocated a maximum of four spatial streams, i.e., NSTS≤4. In other embodiments, a client station can be allocated a suitable number of spatial streams that is more than four.

Additionally, in the example encoding of Table 1, NSTS assigned to client stations are in the descending order according to the order of user fields 216. For example, NSTS[m] is greater than or equal to NSTS[m+1], according to an embodiment.

TABLE 1

| Nuser | Spatial Config. Subfield (bits B5-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| 2 | 000000-000011 | 1-4 | 1 | | | | | | | 2-5 | 10 |
|   | 000100-000110 | 2-4 | 2 | | | | | | | 4-6 | |
|   | 000111-001000 | 3-4 | 3 | | | | | | | 6-7 | |
|   | 001001 | 4 | 4 | | | | | | | 8 | |
| 3 | 000000-000011 | 1-4 | 1 | 1 | | | | | | 3-6 | 20 |
|   | 000100-000110 | 2-4 | 2 | 1 | | | | | | 5-7 | |
|   | 000111-001000 | 3-4 | 3 | 1 | | | | | | 7-8 | |
|   | 001001 | 4 | 4 | 1 | | | | | | 9 | |
|   | 001010-001100 | 2-4 | 2 | 2 | | | | | | 6-8 | |
|   | 001101-001110 | 3-4 | 3 | 2 | | | | | | 8-9 | |
|   | 001111 | 4 | 4 | 2 | | | | | | 10 | |

TABLE 1-continued

| Nuser | Spatial Config. Subfield (bits B5-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 010000-010001 | 3-4 | 3 | 3 | | | | | | 9-10 | |
| | 010010 | 4 | 4 | 3 | | | | | | 11 | |
| | 010011 | 4 | 4 | 4 | | | | | | 12 | |
| 4 | 000000-000011 | 1-4 | 1 | 1 | 1 | | | | | 4-7 | 34 |
| | 000100-000110 | 2-4 | 2 | 1 | 1 | | | | | 6-8 | |
| | 000111-001000 | 3-4 | 3 | 1 | 1 | | | | | 8-9 | |
| | 001001 | 4 | 4 | 1 | 1 | | | | | 10 | |
| | 001010-001100 | 2-4 | 2 | 2 | 1 | | | | | 7-9 | |
| | 001101-001110 | 3-4 | 3 | 2 | 1 | | | | | 9-10 | |
| | 001111 | 4 | 4 | 2 | 1 | | | | | 11 | |
| | 010000-010001 | 3-4 | 3 | 3 | 1 | | | | | 10-11 | |
| | 010010 | 4 | 4 | 3 | 1 | | | | | 12 | |
| | 010011 | 4 | 4 | 4 | 1 | | | | | 13 | |
| | 010100-010110 | 2-4 | 2 | 2 | 2 | | | | | 8-10 | |
| | 010111-011000 | 3-4 | 3 | 2 | 2 | | | | | 10-11 | |
| | 011001 | 4 | 4 | 2 | 2 | | | | | 12 | |
| | 011010-011011 | 3-4 | 3 | 3 | 2 | | | | | 11-12 | |
| | 011100 | 4 | 4 | 3 | 2 | | | | | 13 | |
| | 011101 | 4 | 4 | 4 | 2 | | | | | 14 | |
| | 011110-011111 | 3-4 | 3 | 3 | 3 | | | | | 12-13 | |
| | 100000 | 4 | 4 | 4 | 3 | | | | | 15 | |
| | 100001 | 4 | 4 | 4 | 4 | | | | | 16 | |
| 5 | 000000-000011 | 1-4 | 1 | 1 | 1 | 1 | | | | 5-8 | 49 |
| | 000100-000110 | 2-4 | 2 | 1 | 1 | 1 | | | | 7-9 | |
| | 000111-001000 | 3-4 | 3 | 1 | 1 | 1 | | | | 9-10 | |
| | 001001 | 4 | 4 | 1 | 1 | 1 | | | | 11 | |
| | 001010-001100 | 2-4 | 2 | 2 | 1 | 1 | | | | 8-10 | |
| | 001101-001110 | 3-4 | 3 | 2 | 1 | 1 | | | | 10-11 | |
| | 001111 | 4 | 4 | 2 | 1 | 1 | | | | 12 | |
| | 010000-010001 | 3-4 | 3 | 3 | 1 | 1 | | | | 11-12 | |
| | 010010 | 4 | 4 | 3 | 1 | 1 | | | | 13 | |
| | 010011 | 4 | 4 | 4 | 1 | 1 | | | | 14 | |
| | 010100-010110 | 2-4 | 2 | 2 | 2 | 1 | | | | 9-11 | |
| | 010111-011000 | 3-4 | 3 | 2 | 2 | 1 | | | | 11-12 | |
| | 011001 | 4 | 4 | 2 | 2 | 1 | | | | 13 | |
| | 011010-011011 | 3-4 | 3 | 3 | 2 | 1 | | | | 12-13 | |
| | 011100 | 4 | 4 | 3 | 2 | 1 | | | | 14 | |
| | 011101 | 4 | 4 | 4 | 2 | 1 | | | | 15 | |
| | 011110-011111 | 3-4 | 3 | 3 | 3 | 1 | | | | 13-14 | |
| | 100000 | 4 | 4 | 3 | 3 | 1 | | | | 15 | |
| | 100001 | 4 | 4 | 4 | 3 | 1 | | | | 16 | |
| | 100010-100100 | 2-4 | 2 | 2 | 2 | 2 | | | | 10-12 | |
| | 100101-100110 | 3-4 | 3 | 2 | 2 | 2 | | | | 12-13 | |
| | 100111 | 4 | 4 | 2 | 2 | 2 | | | | 14 | |
| | 101000-101001 | 3-4 | 3 | 3 | 2 | 2 | | | | 13-14 | |
| | 101010 | 4 | 4 | 3 | 2 | 2 | | | | 15 | |
| | 101011 | 4 | 4 | 4 | 2 | 2 | | | | 16 | |
| | 101100-101101 | 3-4 | 3 | 3 | 3 | 2 | | | | 14-15 | |
| | 101110 | 4 | 4 | 3 | 3 | 2 | | | | 16 | |

TABLE 1-continued

| Nuser | Spatial Config. Subfield (bits B5-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 101111-110000 | 3-4 | 3 | 3 | 3 | 3 | | | | 15-16 | |
| 6 | 000000-000011 | 1-4 | 1 | 1 | 1 | 1 | 1 | | | 6-9 | 54 |
| | 000100-000110 | 2-4 | 2 | 1 | 1 | 1 | 1 | | | 8-10 | |
| | 000111-001000 | 3-4 | 3 | 1 | 1 | 1 | 1 | | | 10-11 | |
| | 001001 | 4 | 4 | 1 | 1 | 1 | 1 | | | 12 | |
| | 001010-001100 | 2-4 | 2 | 2 | 1 | 1 | 1 | | | 9-11 | |
| | 001101-001110 | 3-4 | 3 | 2 | 1 | 1 | 1 | | | 11-12 | |
| | 001111 | 4 | 4 | 2 | 1 | 1 | 1 | | | 13 | |
| | 010000-010001 | 3-4 | 3 | 3 | 1 | 1 | 1 | | | 12-13 | |
| | 010010 | 4 | 4 | 3 | 1 | 1 | 1 | | | 14 | |
| | 010011 | 4 | 4 | 4 | 1 | 1 | 1 | | | 15 | |
| | 010100-010110 | 2-4 | 2 | 2 | 2 | 1 | 1 | | | 10-12 | |
| | 010111-011000 | 3-4 | 3 | 2 | 2 | 1 | 1 | | | 12-13 | |
| | 011001 | 4 | 4 | 2 | 2 | 1 | 1 | | | 14 | |
| | 011010-011011 | 3-4 | 3 | 3 | 2 | 1 | 1 | | | 13-14 | |
| | 011100 | 4 | 4 | 3 | 2 | 1 | 1 | | | 15 | |
| | 011101 | 4 | 4 | 4 | 2 | 1 | 1 | | | 16 | |
| | 011110-011111 | 3-4 | 3 | 3 | 3 | 1 | 1 | | | 14-15 | |
| | 100000 | 4 | 4 | 3 | 3 | 1 | 1 | | | 16 | |
| | 100001-100011 | 2-4 | 2 | 2 | 2 | 2 | 1 | | | 11-13 | |
| | 100100-100101 | 3-4 | 3 | 2 | 2 | 2 | 1 | | | 13-14 | |
| | 100110 | 4 | 4 | 2 | 2 | 2 | 1 | | | 15 | |
| | 100111-101000 | 3-4 | 3 | 3 | 2 | 2 | 1 | | | 14-15 | |
| | 101001 | 4 | 4 | 3 | 2 | 2 | 1 | | | 16 | |
| | 101010-101011 | 3-4 | 3 | 3 | 3 | 2 | 1 | | | 15-16 | |
| | 101100 | 3 | 3 | 3 | 3 | 3 | 1 | | | 16 | |
| | 101101-101111 | 2-4 | 2 | 2 | 2 | 2 | 2 | | | 12-14 | |
| | 110000-110001 | 3-4 | 3 | 2 | 2 | 2 | 2 | | | 14-15 | |
| | 110010 | 4 | 4 | 2 | 2 | 2 | 2 | | | 16 | |
| | 110011-110100 | 3-4 | 3 | 3 | 2 | 2 | 2 | | | 15-16 | |
| | 110101 | 3 | 3 | 3 | 3 | 2 | 2 | | | 16 | |
| 7 | 000000-000011 | 1-4 | 1 | 1 | 1 | 1 | 1 | 1 | | 7-10 | 50 |
| | 000100-000110 | 2-4 | 2 | 1 | 1 | 1 | 1 | 1 | | 9-11 | |
| | 000111-001000 | 3-4 | 3 | 1 | 1 | 1 | 1 | 1 | | 11-12 | |
| | 001001 | 4 | 4 | 1 | 1 | 1 | 1 | 1 | | 13 | |
| | 001010-001100 | 2-4 | 2 | 2 | 1 | 1 | 1 | 1 | | 10-12 | |
| | 001101-001110 | 3-4 | 3 | 2 | 1 | 1 | 1 | 1 | | 12-13 | |
| | 001111 | 4 | 4 | 2 | 1 | 1 | 1 | 1 | | 14 | |
| | 010000-010001 | 3-4 | 3 | 3 | 1 | 1 | 1 | 1 | | 13-14 | |
| | 010010 | 4 | 4 | 3 | 1 | 1 | 1 | 1 | | 15 | |
| | 010011 | 4 | 4 | 4 | 1 | 1 | 1 | 1 | | 16 | |
| | 010100-010110 | 2-4 | 2 | 2 | 2 | 1 | 1 | 1 | | 11-13 | |
| | 010111-011000 | 3-4 | 3 | 2 | 2 | 1 | 1 | 1 | | 13-14 | |
| | 011001 | 4 | 4 | 2 | 2 | 1 | 1 | 1 | | 15 | |
| | 011010-011011 | 3-4 | 3 | 3 | 2 | 1 | 1 | 1 | | 14-15 | |
| | 011100 | 4 | 4 | 3 | 2 | 1 | 1 | 1 | | 16 | |
| | 011101- | 3-4 | 3 | 3 | 3 | 1 | 1 | 1 | | 15-16 | |

TABLE 1-continued

| Nuser | Spatial Config. Subfield (bits B5-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 011110 011111-100001 | 2-4 | 2 | 2 | 2 | 2 | 1 | 1 | | 12-14 | |
| | 100010-100011 | 3-4 | 3 | 2 | 2 | 2 | 1 | 1 | | 14-15 | |
| | 100100 | 4 | 4 | 2 | 2 | 2 | 1 | 1 | | 16 | |
| | 100101-100110 | 3-4 | 3 | 3 | 2 | 2 | 1 | 1 | | 15-16 | |
| | 100111 | 3 | 3 | 3 | 3 | 2 | 1 | 1 | | 16 | |
| | 101000-101010 | 2-4 | 2 | 2 | 2 | 2 | 2 | 1 | | 13-15 | |
| | 101011-101100 | 3-4 | 3 | 2 | 2 | 2 | 2 | 1 | | 15-16 | |
| | 101101 | 3 | 3 | 3 | 2 | 2 | 2 | 1 | | 16 | |
| | 101110-110000 | 2-4 | 2 | 2 | 2 | 2 | 2 | 2 | | 14-16 | |
| | 110001 | 3 | 3 | 2 | 2 | 2 | 2 | 2 | | 16 | |
| 8 | 000000-000011 | 1-4 | 1 | 1 | 1 | 1 | 1 | 1 | 1 | 8-11 | 41 |
| | 000100-000110 | 2-4 | 2 | 1 | 1 | 1 | 1 | 1 | 1 | 10-12 | |
| | 000111-001000 | 3-4 | 3 | 1 | 1 | 1 | 1 | 1 | 1 | 12-13 | |
| | 001001 | 4 | 4 | 1 | 1 | 1 | 1 | 1 | 1 | 14 | |
| | 001010-001100 | 2-4 | 2 | 2 | 1 | 1 | 1 | 1 | 1 | 11-13 | |
| | 001101-001110 | 3-4 | 3 | 2 | 1 | 1 | 1 | 1 | 1 | 13-14 | |
| | 001111 | 4 | 4 | 2 | 1 | 1 | 1 | 1 | 1 | 15 | |
| | 010000-010001 | 3-4 | 3 | 3 | 1 | 1 | 1 | 1 | 1 | 14-15 | |
| | 010010 | 4 | 4 | 3 | 1 | 1 | 1 | 1 | 1 | 16 | |
| | 010011-010101 | 2-4 | 2 | 2 | 2 | 1 | 1 | 1 | 1 | 12-14 | |
| | 010110-010111 | 3-4 | 3 | 2 | 2 | 1 | 1 | 1 | 1 | 14-15 | |
| | 011000 | 4 | 4 | 2 | 2 | 1 | 1 | 1 | 1 | 16 | |
| | 011001-011010 | 3-4 | 3 | 3 | 2 | 1 | 1 | 1 | 1 | 15-16 | |
| | 011011 | 3 | 3 | 3 | 3 | 1 | 1 | 1 | 1 | 16 | |
| | 011100-011110 | 2-4 | 2 | 2 | 2 | 2 | 1 | 1 | 1 | 13-15 | |
| | 011111-100000 | 3-4 | 3 | 2 | 2 | 2 | 1 | 1 | 1 | 15-16 | |
| | 100001 | 3 | 3 | 3 | 2 | 2 | 1 | 1 | 1 | 16 | |
| | 100010-100100 | 2-4 | 2 | 2 | 2 | 2 | 2 | 1 | 1 | 14-16 | |
| | 100101 | 3 | 3 | 2 | 2 | 2 | 2 | 1 | 1 | 16 | |
| | 100110-100111 | 2-3 | 2 | 2 | 2 | 2 | 2 | 2 | 1 | 15-16 | |
| | 101000 | 2 | 2 | 2 | 2 | 2 | 2 | 2 | 2 | 16 | |

The example encoding of Table 1 accommodates all possible permutations of MU-MIMO spatial stream allocations, subject to the restrictions discussed above. Because a spatial configuration subfield 224 is included in each user field 216 corresponding to a MU-MIMO transmission, the overhead associated with the spatial configuration subfield 224 can be significant, especially for wide bandwidth DL MU packets such as 160 MHz or 320 MHz, which can accommodate larger numbers of RUs, each of which may be used for an MU-MIMO transmission.

Some of the MU-MIMO configurations listed in Table 1 are inferior to some other MU-MIMO pairings listed in Table 1, e.g., less throughput with the same or even greater total number of spatial streams, and/or require higher transmit power to achieve the same throughput. By removing some of the possible MU-MIMO configurations, such as inferior MU-MIMO configurations, the total number of MU-MIMO configurations can be reduced and thus the number of bits used for the spatial configuration subfields 224 can be reduced.

Table 2 is an example encoding of a 5-bit spatial configuration subfield for an MU-MIMO transmission, according to another embodiment. Similar to the example encoding of Table 1, a maximum total number of client stations corresponding to a single MU-MIMO transmission is eight, i.e., Nuser≤8, and a client station can be allocated a maximum of four spatial streams, i.e., NSTS≤4. In other embodiments, a maximum total number of client stations corresponding to a single MU-MIMO transmission is a suitable number more than eight, such as nine, ten, eleven, etc., and/or a client station can be allocated a suitable number of spatial streams that is more than four. Additionally, similar to the example encoding of Table 1, NSTS assigned to client stations are in the descending order according to the order of user fields 216. For example, NSTS[m] is greater than or equal to NSTS[m+1], according to an embodiment.

TABLE 2

| Nuser | Spatial Config. Subfield (bits B4-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| 2 | 00000-00011 | 1-4 | 1 | | | | | | | 2-5 | 10 |
| | 00100-00110 | 2-4 | 2 | | | | | | | 4-6 | |
| | 00111-01000 | 3-4 | 3 | | | | | | | 6-7 | |
| | 01001 | 4 | 4 | | | | | | | 8 | |
| 3 | 00000-00011 | 1-4 | 1 | 1 | | | | | | 3-6 | 20 |
| | 00100-00110 | 2-4 | 2 | 1 | | | | | | 5-7 | |
| | 00111-01000 | 3-4 | 3 | 1 | | | | | | 7-8 | |
| | 01001 | 4 | 4 | 1 | | | | | | 9 | |
| | 01010-01100 | 2-4 | 2 | 2 | | | | | | 6-8 | |
| | 01101-01110 | 3-4 | 3 | 2 | | | | | | 8-9 | |
| | 01111 | 4 | 4 | 2 | | | | | | 10 | |
| | 10000-10001 | 3-4 | 3 | 3 | | | | | | 9-10 | |
| | 10010 | 4 | 4 | 3 | | | | | | 11 | |
| | 10011 | 4 | 4 | 4 | | | | | | 12 | |
| 4 | 00000-00011 | 1-4 | 1 | 1 | 1 | | | | | 4-7 | 32 |
| | 00100-00110 | 2-4 | 2 | 1 | 1 | | | | | 6-8 | |
| | 00111-01000 | 3-4 | 3 | 1 | 1 | | | | | 8-9 | |
| | 01001 | 4 | 4 | 1 | 1 | | | | | 10 | |
| | 01010-01100 | 2-4 | 2 | 2 | 1 | | | | | 7-9 | |
| | 01101-01110 | 3-4 | 3 | 2 | 1 | | | | | 9-10 | |
| | 01111 | 4 | 4 | 2 | 1 | | | | | 11 | |
| | 10000-10001 | 3-4 | 3 | 3 | 1 | | | | | 10-11 | |
| | 10010 | 4 | 4 | 3 | 1 | | | | | 12 | |
| | 10011 | 4 | 4 | 4 | 1 | | | | | 13 | |
| | 10100-10110 | 2-4 | 2 | 2 | 2 | | | | | 8-10 | |
| | 10111-11000 | 3-4 | 3 | 2 | 2 | | | | | 10-11 | |
| | 11001 | 4 | 4 | 2 | 2 | | | | | 12 | |
| | 11010-11011 | 3-4 | 3 | 3 | 2 | | | | | 11-12 | |
| | 11100 | 4 | 4 | 3 | 2 | | | | | 13 | |
| | 11101 | 4 | 4 | 4 | 2 | | | | | 14 | |
| | 11110-11111 | 3-4 | 3 | 3 | 3 | | | | | 12-13 | |
| 5 | 00000-00011 | 1-4 | 1 | 1 | 1 | 1 | | | | 5-8 | 32 |
| | 00100-00110 | 2-4 | 2 | 1 | 1 | 1 | | | | 7-9 | |
| | 00111-01000 | 3-4 | 3 | 1 | 1 | 1 | | | | 9-10 | |
| | 01001 | 4 | 4 | 1 | 1 | 1 | | | | 11 | |
| | 01010-01100 | 2-4 | 2 | 2 | 1 | 1 | | | | 8-10 | |
| | 01101-01110 | 3-4 | 3 | 2 | 1 | 1 | | | | 10-11 | |
| | 10000 | 3 | 3 | 3 | 1 | 1 | | | | 11 | |
| | 10001-10010 | 2-4 | 2 | 2 | 2 | 1 | | | | 9-11 | |
| | 10011-10100 | 3-4 | 3 | 2 | 2 | 1 | | | | 11-12 | |
| | 10101-10110 | 3-4 | 3 | 3 | 2 | 1 | | | | 12-13 | |
| | 10111 | 3 | 3 | 3 | 3 | 1 | | | | 13 | |
| | 11000-11010 | 2-4 | 2 | 2 | 2 | 2 | | | | 10-12 | |
| | 11011-11100 | 3-4 | 3 | 2 | 2 | 2 | | | | 12-13 | |
| | 11101- | 3-4 | 3 | 3 | 2 | 2 | | | | 13-14 | |

TABLE 2-continued

| Nuser | Spatial Config. Subfield (bits B4-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 11110 | | | | | | | | | | |
| | 11111 | 3 | 3 | 3 | 3 | 2 | | | | 14 | |
| 6 | 00000-00011 | 1-4 | 1 | 1 | 1 | 1 | 1 | | | 6-9 | 32 |
| | 00100-00110 | 2-4 | 2 | 1 | 1 | 1 | 1 | | | 8-10 | |
| | 00111-01000 | 3-4 | 3 | 1 | 1 | 1 | 1 | | | 10-11 | |
| | 01001-01011 | 2-4 | 2 | 2 | 1 | 1 | 1 | | | 9-11 | |
| | 01100-01101 | 3-4 | 3 | 2 | 1 | 1 | 1 | | | 11-12 | |
| | 01110-01111 | 3-4 | 3 | 3 | 1 | 1 | 1 | | | 12-13 | |
| | 10000-10010 | 2-4 | 2 | 2 | 2 | 1 | 1 | | | 10-12 | |
| | 10011-10100 | 3-4 | 3 | 2 | 2 | 1 | 1 | | | 12-13 | |
| | 10101 | 3 | 3 | 3 | 2 | 1 | 1 | | | 13 | |
| | 10110-11000 | 2-4 | 2 | 2 | 2 | 2 | 1 | | | 11-13 | |
| | 11001-11010 | 3-4 | 3 | 2 | 2 | 2 | 1 | | | 13-14 | |
| | 11011 | 3 | 3 | 3 | 2 | 2 | 1 | | | 14 | |
| | 11100-11110 | 2-4 | 2 | 2 | 2 | 2 | 2 | | | 12-14 | |
| | 11111 | 3 | 3 | 2 | 2 | 2 | 2 | | | 14 | |
| 7 | 00000-00011 | 1-4 | 1 | 1 | 1 | 1 | 1 | 1 | | 7-10 | 32 |
| | 00100-00110 | 2-4 | 2 | 1 | 1 | 1 | 1 | 1 | | 9-11 | |
| | 00111 | 3 | 3 | 1 | 1 | 1 | 1 | 1 | | 11 | |
| | 01000-01010 | 2-4 | 2 | 2 | 1 | 1 | 1 | 1 | | 10-12 | |
| | 01011 | 3 | 3 | 2 | 1 | 1 | 1 | 1 | | 12 | |
| | 01100 | 3 | 3 | 3 | 1 | 1 | 1 | 1 | | 13 | |
| | 01101-01111 | 2-4 | 2 | 2 | 2 | 1 | 1 | 1 | | 11-13 | |
| | 10000 | 3 | 3 | 2 | 2 | 1 | 1 | 1 | | 13 | |
| | 10001 | 3 | 3 | 3 | 2 | 1 | 1 | 1 | | 14 | |
| | 10010 | 3 | 3 | 3 | 3 | 1 | 1 | 1 | | 15 | |
| | 10011-10101 | 2-4 | 2 | 2 | 2 | 2 | 1 | 1 | | 12-14 | |
| | 10110 | 3 | 3 | 2 | 2 | 2 | 1 | 1 | | 14 | |
| | 10111 | 3 | 3 | 3 | 3 | 2 | 1 | 1 | | 16 | |
| | 11000-11010 | 2-4 | 2 | 2 | 2 | 2 | 2 | 1 | | 13-15 | |
| | 11011 | 3 | 3 | 2 | 2 | 2 | 2 | 1 | | 15 | |
| | 11100 | 3 | 3 | 3 | 2 | 2 | 2 | 1 | | 16 | |
| | 11101-11110 | 2-3 | 2 | 2 | 2 | 2 | 2 | 2 | | 14-15 | |
| | 11111 | 3 | 3 | 2 | 2 | 2 | 2 | 2 | | 16 | |
| 8 | 00000-00011 | 1-4 | 1 | 1 | 1 | 1 | 1 | 1 | 1 | 8-11 | 32 |
| | 00100-00110 | 2-4 | 2 | 1 | 1 | 1 | 1 | 1 | 1 | 10-12 | |
| | 00111-01000 | 3-4 | 3 | 1 | 1 | 1 | 1 | 1 | 1 | 12-13 | |
| | 01001-01011 | 2-4 | 2 | 2 | 1 | 1 | 1 | 1 | 1 | 11-13 | |
| | 01100 | 3 | 3 | 2 | 1 | 1 | 1 | 1 | 1 | 13 | |
| | 01101 | 3 | 3 | 3 | 1 | 1 | 1 | 1 | 1 | 14 | |
| | 01110-10000 | 2-4 | 2 | 2 | 2 | 1 | 1 | 1 | 1 | 12-14 | |
| | 10001 | 3 | 3 | 2 | 2 | 1 | 1 | 1 | 1 | 14 | |
| | 10010 | 3 | 3 | 3 | 2 | 1 | 1 | 1 | 1 | 15 | |
| | 10011 | 3 | 3 | 3 | 3 | 1 | 1 | 1 | 1 | 16 | |
| | 10100-10110 | 2-4 | 2 | 2 | 2 | 2 | 1 | 1 | 1 | 13-15 | |
| | 10111 | 3 | 3 | 2 | 2 | 2 | 1 | 1 | 1 | 15 | |
| | 11000 | 3 | 3 | 3 | 2 | 2 | 1 | 1 | 1 | 16 | |
| | 11001-11011 | 2-4 | 2 | 2 | 2 | 2 | 2 | 1 | 1 | 14-16 | |
| | 11100 | 3 | 3 | 2 | 2 | 2 | 2 | 1 | 1 | 16 | |

TABLE 2-continued

| Nuser | Spatial Config. Subfield (bits B4-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 11101-11110 | 2-3 | 2 | 2 | 2 | 2 | 2 | 2 | 1 | 15-16 | |
| | 11111 | 2 | 2 | 2 | 2 | 2 | 2 | 2 | 2 | 16 | |

In the example encoding of Table 2, for Nuser=4, when three client stations are each allocated four spatial streams, the total number of spatial streams cannot exceed 14. Also, for Nuser=5, no more than two client stations can be allocated four spatial streams; and when two client stations are allocated four spatial streams, the total number of streams cannot exceed 11. For Nuser≥6, no more than one client station can be allocated four spatial streams. For Nuser≤6, the total number of spatial streams cannot exceed fourteen. For Nuser=7, when one client station is allocated four spatial streams, no other client station can be allocated more than two spatial streams. For Nuser=8, when one client station is allocated four spatial streams and another client station is allocated three spatial streams, the total number of spatial streams cannot exceed thirteen.

Table 3 is an example encoding of a 4-bit spatial configuration subfield for an MU-MIMO transmission, according to another embodiment. Similarly to the example encoding of Table 1, a maximum total number of client stations corresponding to a single MU-MIMO transmission is eight, i.e., Nuser≤8, and a client station can be allocated a maximum of four spatial streams, i.e., NSTS≤4. In other embodiments, a maximum total number of client stations corresponding to a single MU-MIMO transmission is a suitable number more than eight, such as nine, ten, eleven, etc., and/or a client station can be allocated a suitable number of spatial streams that is more than four. Additionally, similarly to the example encoding of Table 1, NSTS assigned to client stations are in the descending order according to the order of user fields 216. For example, NSTS[m] is greater than or equal to NSTS[m+1], according to an embodiment.

TABLE 3

| Nuser | Spatial Config. Subfield (bits B3-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 16 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100-1101 | 3-4 | 3 | 2 | | | | | | 8-9 | |
| | 1110-1111 | 3-4 | 3 | 3 | | | | | | 9-10 | |
| 4 | 0000-0011 | 1-4 | 1 | 1 | 1 | | | | | 4-7 | 16 |
| | 0100-0110 | 2-4 | 2 | 1 | 1 | | | | | 6-8 | |
| | 0111 | 3 | 3 | 1 | 1 | | | | | 8 | |
| | 1000-1010 | 2-4 | 2 | 2 | 1 | | | | | 7-9 | |
| | 1011 | 3 | 3 | 2 | 1 | | | | | 9 | |
| | 1100-1110 | 2-4 | 2 | 2 | 2 | | | | | 8-10 | |
| | 1111 | 3 | 3 | 2 | 2 | | | | | 10 | |
| 5 | 0000-0011 | 1-4 | 1 | 1 | 1 | 1 | | | | 5-8 | 16 |
| | 0100-0110 | 2-4 | 2 | 1 | 1 | 1 | | | | 7-9 | |
| | 0111 | 3 | 3 | 1 | 1 | 1 | | | | 9 | |
| | 1000-1001 | 2-3 | 2 | 2 | 1 | 1 | | | | 8-9 | |
| | 1010 | 3 | 3 | 2 | 1 | 1 | | | | 10 | |
| | 1011- | 2-3 | 2 | 2 | 2 | 1 | | | | 9-10 | |

TABLE 3-continued

| Nuser | Spatial Config. Subfield (bits B3-B0) | NSTS [1] | NSTS [2] | NSTS [3] | NSTS [4] | NSTS [5] | NSTS [6] | NSTS [7] | NSTS [8] | Total NSTS | Number of entries |
|---|---|---|---|---|---|---|---|---|---|---|---|
| | 1100 | | | | | | | | | | |
| | 1101 | 3 | 3 | 2 | 2 | 1 | | | | 11 | |
| | 1110-1111 | 2-3 | 2 | 2 | 2 | 2 | | | | 10-11 | |
| 6 | 0000-0011 | 1-4 | 1 | 1 | 1 | 1 | 1 | | | 6-9 | 16 |
| | 0100-0101 | 2-3 | 2 | 1 | 1 | 1 | 1 | | | 8-9 | |
| | 0110 | 3 | 3 | 1 | 1 | 1 | 1 | | | 10 | |
| | 0111-1000 | 2-3 | 2 | 2 | 1 | 1 | 1 | | | 9-10 | |
| | 1001 | 3 | 3 | 2 | 1 | 1 | 1 | | | 11 | |
| | 1010-1011 | 2-3 | 2 | 2 | 2 | 1 | 1 | | | 10-11 | |
| | 1100-1101 | 2-3 | 2 | 2 | 2 | 2 | 1 | | | 11-12 | |
| | 1110-1111 | 2-3 | 2 | 2 | 2 | 2 | 2 | | | 12-13 | |
| 7 | 0000-0011 | 1-4 | 1 | 1 | 1 | 1 | 1 | 1 | | 7-10 | 16 |
| | 0100-0101 | 2-3 | 2 | 1 | 1 | 1 | 1 | 1 | | 9-10 | |
| | 0110 | 3 | 3 | 1 | 1 | 1 | 1 | 1 | | 11 | |
| | 0111-1000 | 2-3 | 2 | 2 | 1 | 1 | 1 | 1 | | 10-11 | |
| | 1001-1010 | 2-3 | 2 | 2 | 2 | 1 | 1 | 1 | | 11-12 | |
| | 1011 | 3 | 3 | 2 | 2 | 1 | 1 | 1 | | 13 | |
| | 1100-1101 | 2-3 | 2 | 2 | 2 | 2 | 1 | 1 | | 12-13 | |
| | 1110-1111 | 2-3 | 2 | 2 | 2 | 2 | 2 | 1 | | 13-14 | |
| 8 | 0000-0011 | 1-4 | 1 | 1 | 1 | 1 | 1 | 1 | 1 | 8-11 | 16 |
| | 0100-0101 | 2-3 | 2 | 1 | 1 | 1 | 1 | 1 | 1 | 10-11 | |
| | 0110-0111 | 2-3 | 2 | 2 | 1 | 1 | 1 | 1 | 1 | 11-12 | |
| | 1000-1001 | 2-3 | 2 | 2 | 2 | 1 | 1 | 1 | 1 | 12-13 | |
| | 1010-1011 | 2-3 | 2 | 2 | 2 | 2 | 1 | 1 | 1 | 13-14 | |
| | 1100-1101 | 2-3 | 2 | 2 | 2 | 2 | 2 | 1 | 1 | 14-15 | |
| | 1110 | 2 | 2 | 2 | 2 | 2 | 2 | 2 | 1 | 15 | |
| | 1111 | 2 | 2 | 2 | 2 | 2 | 2 | 2 | 2 | 16 | |

In the example encoding of Table 3, for Nuser≥3, no more than one client station can be allocated four spatial streams. For Nuser=3 or 4, the total number of spatial streams cannot exceed ten. For Nuser≥4, if one client station is allocated three spatial streams, no other client station can be allocated more than three spatial streams. For Nuser≥5, two client stations are allocated two spatial streams, no other client station can be allocated more than three spatial streams. For Nuser=5, the total number of spatial streams cannot exceed eleven. For Nuser≥6, if two client stations are allocated two spatial streams, no other client station can be allocated more than three spatial streams. For Nuser=6, the total number of spatial streams cannot exceed 13. For Nuser=7, the total number of spatial streams cannot exceed 14.

Referring now to FIGS. 1 and 2, and Tables 1-3, in connection with decoding a spatial stream configuration subfield of an MU PHY packet, the spatial stream configuration decoder 192 receives i) a number of intended receivers for an MU-MIMO transmission within the MU PHY packet, and ii) an indication of a position, within a set of user fields 216 corresponding to the MU-MIMO transmission, of the user field 216 that corresponds to the client station, and uses the determined position, within the set, to decode the spatial configuration subfield 224, according to an embodiment. For example, the number of intended receivers and the value of the spatial stream configuration subfield indicate a particular row of the Tables 1-3, and the position of the user field 216 indicates a particular column of the Tables 1-3. The indicated row and column of the Tables 1-3 indicate a particular number of spatial streams corresponding to the client station 154.

In an embodiment, the client station determines the number of intended receivers for the MU-MIMO transmission within the MU PHY packet using information in the RU allocation information 208. In an embodiment, the client station determines the position, within the set of user fields 216 corresponding to the MU-MIMO transmission, of the user field 216 that corresponds to the client station by analyzing the RU allocation information 208 and the user fields 216.

Figure 3:
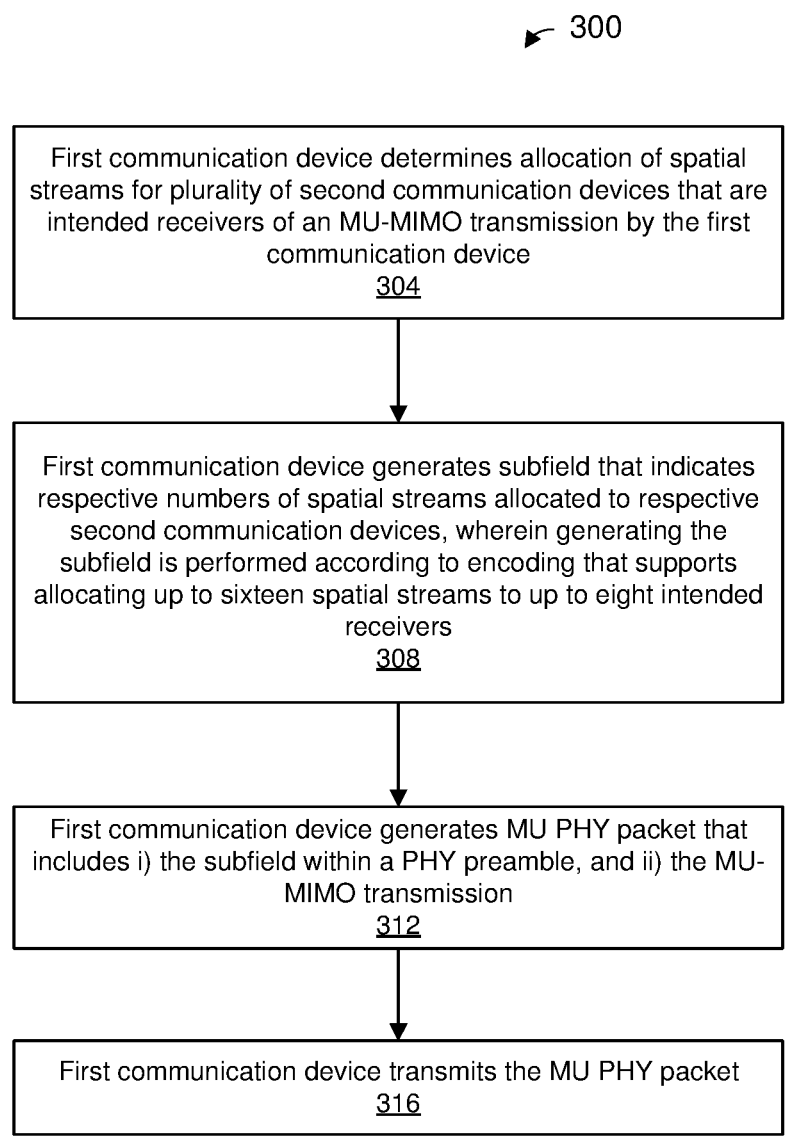
FIG. 3 is a flow diagram of an example method for communicating in a WLAN that utilizes MU-MIMO, according to an embodiment.

FIG. 3 is a flow diagram of an example method 300 for communicating in a WLAN that utilizes MU-MIMO, according to an embodiment. In some embodiments, the AP 114 is configured to implement the method 300, and FIG. 3 is described with reference to FIG. 1 merely for explanatory purposes. In other embodiments, the method 300 is implemented by another suitable communication device.

At block 304, a first communication device determines (e.g., the network interface 122 determines, the MAC processor 126 determines, etc.) an allocation of spatial streams for a plurality of second communication devices that are intended receivers of an MU-MIMO transmission by the first communication device. In an embodiment, the first communication is configured to (e.g., the network interface 122 is configured to, the MAC processor 126 is configured to, etc.) allocate up to sixteen spatial streams to up to eight intended receivers.

At block 308, the first communication device generates (e.g., the network interface 122 generates, the PHY processor 130 generates, the spatial stream configuration subfield generator 142 generates, etc.) a subfield that indicates respective numbers of spatial streams allocated to respective second communication devices among the plurality of second communication devices. In an embodiment, generating the subfield at block 308 is performed according to an encoding that supports allocating up to sixteen spatial streams to up to eight intended receivers. In an embodiment, the subfield is generated at block 308 to consist of six or fewer bits.

In one embodiment, generating the subfield at block 308 comprises generating the subfield according to the encoding of Table 1. In another embodiment, generating the subfield at block 308 comprises generating the subfield according to the encoding of Table 2. In another embodiment, generating the subfield at block 308 comprises generating the subfield according to the encoding of Table 3.

In an embodiment, generating the subfield at block 308 comprises generating the subfield according to an encoding that supports only a subset of all possible combinations of i) numbers of spatial streams to up to sixteen, and ii) numbers of intended receivers up to eight; and determining the allocation of spatial streams at block 304 comprises determining an allocation of spatial streams from the subset.

In another embodiment, generating the subfield at block 308 comprises generating the subfield to consist of five bits.

In another embodiment, generating the subfield at block 308 comprises generating the subfield according to an encoding that supports only a subset of all possible combinations that excludes allocating four spatial streams to three or more intended receivers when the number of intended receivers is five or more.

In another embodiment, generating the subfield at block 308 comprises generating the subfield according to an encoding that supports only a subset of all possible combinations that excludes allocating four spatial streams to more than one intended receiver when the number of intended receivers is six or more.

In another embodiment, generating the subfield at block 308 comprises generating the subfield according to an encoding that supports only a subset of all possible combinations that excludes allocating more than fourteen spatial streams when the number of intended receivers is less than seven.

In another embodiment, generating the subfield at block 308 comprises generating the subfield to consist of four bits.

In another embodiment, generating the subfield at block 308 comprises generating the subfield according to an encoding that supports only a subset of all possible combinations that excludes allocating four spatial streams to two or more intended receivers when the number of intended receivers is three or more.

In another embodiment, generating the subfield at block 308 comprises generating the subfield according to an encoding that supports only a subset of all possible combinations that excludes allocating more than eleven spatial streams when the number of intended receivers if five.

At block 312, the first communication device generates (e.g., the network interface 122 generates, the PHY processor 130 generates, etc.) an MU PHY data unit that includes i) a PHY preamble, and ii) the MU-MIMO transmission. In an embodiment, generating the MU PHY data unit at block 312 includes: generating the PHY preamble to include the subfield, and generating a PHY data portion of the MU PHY data unit to include the MU-MIMO transmission.

At block 316, the first communication device transmits (e.g., the network interface 122 transmits, the PHY processor 130 transmits, the transceivers 134 transmit, etc.) the MU PHY data unit generated at block 312. In an embodiment, the MAC processor 126 controls the network interface 122 to transmit the MU PHY data unit.

Figure 4:
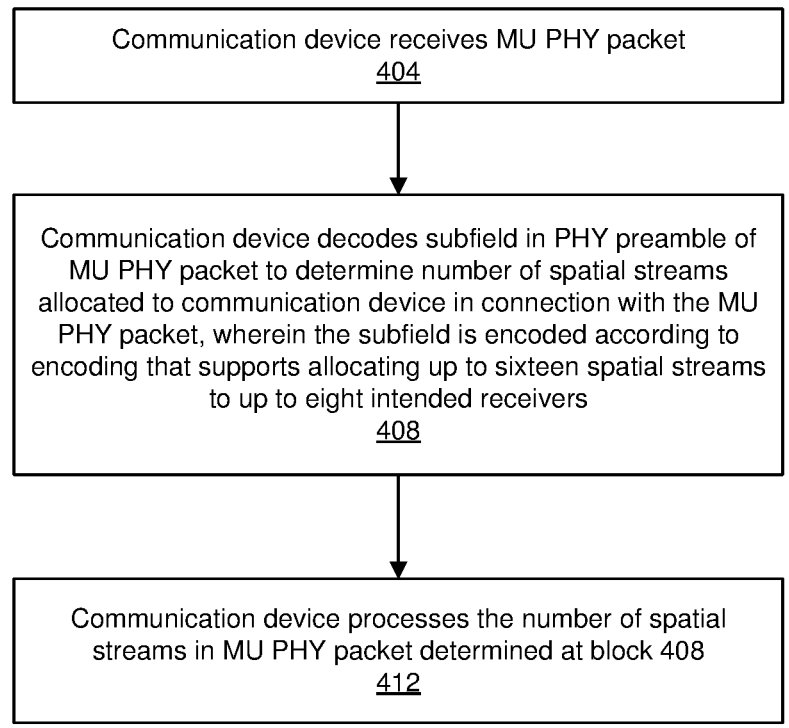
FIG. 4 is a flow diagram of another example method for communicating in a WLAN that utilizes MU-MIMO, according to another embodiment.

FIG. 4 is a flow diagram of another example method 400 for communicating in a WLAN that utilizes MU-MIMO, according to another embodiment. In some embodiments, the client station 154-1 is configured to implement the method 400, and FIG. 4 is described with reference to FIG. 1 merely for explanatory purposes. In other embodiments, the method 400 is implemented by another suitable communication device.

At block 404, a communication device receives (e.g., the network interface 162 receives, the PHY processor 170 receives, the transceivers 134 receive, etc.) an MU PHY data unit.

At block 408, the communication device decodes (e.g., the network interface 162 decodes, the PHY processor 170 decodes, the spatial stream configuration subfield decoder 192, etc.) a subfield (e.g., a spatial stream configuration subfield) in a PHY preamble of the MU PHY data unit received at block 404. a subfield that indicates respective numbers of spatial streams allocated to respective second communication devices among the plurality of second communication devices. In an embodiment, the subfield decoded at block 408 has been encoded according to an encoding that supports allocating up to sixteen spatial streams to up to eight intended receivers. In an embodiment, the subfield is decoded at block 408 to consist of six or fewer bits.

In one embodiment, the subfield decoded at block 408 has been encoded according to the encoding of Table 1. In another embodiment, the subfield decoded at block 408 has been encoded according to the encoding of Table 2. In another embodiment, the subfield decoded at block 408 has been encoded according to the encoding of Table 3.

In an embodiment, the subfield decoded at block 408 has been encoded according to an encoding that supports only a subset of all possible combinations of i) numbers of spatial streams to up to sixteen, and ii) numbers of intended receivers up to eight.

In another embodiment, the subfield decoded at block 408 consists of five bits.

In another embodiment, the subfield decoded at block 408 has been encoded according to an encoding that supports only a subset of all possible combinations that excludes allocating four spatial streams to three or more intended receivers when the number of intended receivers is five or more.

In another embodiment, the subfield decoded at block 408 has been encoded according to an encoding that supports only a subset of all possible combinations that excludes allocating four spatial streams to more than one intended receiver when the number of intended receivers is six or more.

In another embodiment, the subfield decoded at block 408 has been encoded according to an encoding that supports only a subset of all possible combinations that excludes allocating more than fourteen spatial streams when the number of intended receivers is less than seven.

In another embodiment, the subfield decoded at block 408 consists of four bits.

In another embodiment, the subfield decoded at block 408 has been encoded according to an encoding that supports only a subset of all possible combinations that excludes allocating four spatial streams to two or more intended receivers when the number of intended receivers is three or more.

In another embodiment, the subfield decoded at block 408 has been encoded according to an encoding that supports only a subset of all possible combinations that excludes allocating more than eleven spatial streams when the number of intended receivers if five.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN) that utilizes multi-user multiple input, multiple output (MU-MIMO), the method comprising:
    determining, at a first communication device, an allocation of spatial streams for a plurality of second communication devices that are intended receivers of an MU-MIMO transmission by the first communication device;
    generating, at the first communication device, a subfield that indicates respective numbers of spatial streams allocated to respective second communication devices among the plurality of second communication devices, wherein generating the subfield is performed according to an encoding that supports allocating up to sixteen spatial streams to up to eight intended receivers, wherein the encoding corresponds to a table having table elements that indicate respective allocated numbers of spatial streams, wherein respective values of the subfield corresponds to respective rows of the table, and wherein respective columns of the table correspond to the respective second communication devices, and wherein the subfield is generated to consist of six or fewer bits;
    generating, at the first communication device, a multi-user physical layer (PHY) data unit that includes i) a PHY preamble, and ii) the MU-MIMO transmission, including:
        generating the PHY preamble to include the subfield, and
        generating a PHY data portion that includes the MU-MIMO transmission; and
    transmitting, by the first communication device, the PHY data unit.

2. The method of claim 1, wherein generating the subfield comprises:
    generating the subfield according to an encoding that corresponds to subfields that consist of six bits.

3. The method of claim 1, wherein:
    generating the subfield comprises generating the subfield according to an encoding that supports only a subset of all possible combinations of i) numbers of spatial streams to up to sixteen, and ii) numbers of intended receivers up to eight; and
    determining the allocation of spatial streams comprises determining an allocation of spatial streams from the subset.

4. The method of claim 3, wherein:
    generating the subfield comprises generating the subfield to consist of five bits.

5. The method of claim 4, wherein:
    generating the subfield comprises generating the subfield according to an encoding that supports only a subset of all possible combinations that excludes allocating four spatial streams to three or more intended receivers when the number of intended receivers is five or more.

6. The method of claim 4, wherein:
    generating the subfield comprises generating the subfield according to an encoding that supports only a subset of all possible combinations that excludes allocating four spatial streams to more than one intended receiver when the number of intended receivers is six or more.

7. The method of claim 4, wherein:
    generating the subfield comprises generating the subfield according to an encoding that supports only a subset of all possible combinations that excludes allocating more than fourteen spatial streams when the number of intended receivers is less than seven.

8. The method of claim 3, wherein:
    generating the subfield comprises generating the subfield to consist of four bits.

9. The method of claim 8, wherein:
    generating the subfield comprises generating the subfield according to an encoding that supports only a subset of all possible combinations that excludes allocating four spatial streams to two or more intended receivers when the number of intended receivers is three or more.

10. The method of claim 1, further comprising:
    generating, at the first communication device, respective user fields corresponding to respective second communication devices, including generating the respective user fields to include the subfield that indicates the respective numbers of spatial streams allocated to the respective second communication devices;

wherein generating the PHY preamble to include the subfield includes generating the PHY preamble to include the respective fields arranged within the PHY preamble in an order; and wherein the respective columns of the table correspond to respective positions of user fields within the PHY preamble.

11. A first communication device, comprising:

a wireless network interface device that is configured to communicate in a wireless local area network (WLAN) using multi-user multiple input, multiple output (MU-MIMO), the wireless network interface device having one or more integrated circuit (IC) devices configured to:

determine an allocation of spatial streams for a plurality of second communication devices that are intended receivers of an MU-MIMO transmission by the first communication device, and generate a subfield that indicates respective numbers of spatial streams allocated to respective second communication devices among the plurality of second communication devices, wherein generating the subfield is performed according to an encoding that supports allocating up to sixteen spatial streams to up to eight intended receivers, wherein the encoding corresponds to a table having table elements that indicate respective allocated numbers of spatial streams, wherein respective values of the subfield corresponds to respective rows of the table, and wherein respective columns of the table corresponds to the respective second communication devices, and wherein the subfield is generated to consist of six or fewer bits, generate a multi-user physical layer (PHY) data unit that includes i) a PHY preamble, and ii) the MU-MIMO transmission, including:

generating the PHY preamble to include the subfield, and generating a PHY data portion that includes the MU-MIMO transmission; and wherein the one or more IC devices are further configured to control the wireless network interface device to transmit the PHY data unit.

12. The first communication device of claim 11, wherein the one or more IC devices are further configured to:

generate the subfield according to an encoding that corresponds to subfields that consist of six bits.

13. The first communication device of claim 11, wherein the one or more IC devices are further configured to:

generate the subfield according to an encoding that supports only a subset of all possible combinations of i) numbers of spatial streams to up to sixteen, and ii) numbers of intended receivers up to eight; and determine the allocation of spatial streams from the subset.

14. The first communication device of claim 13, wherein the one or more IC devices are further configured to:

generate the subfield to consist of five bits.

15. The first communication device of claim 14, wherein the one or more IC devices are further configured to:

generate the subfield according to an encoding that supports only a subset of all possible combinations that excludes allocating four spatial streams to three or more intended receivers when the number of intended receivers is five or more.

16. The first communication device of claim 14, wherein the one or more IC devices are further configured to:

generate the subfield according to an encoding that supports only a subset of all possible combinations that excludes allocating four spatial streams to more than one intended receiver when the number of intended receivers is six or more.

17. The first communication device of claim 14, wherein the one or more IC devices are further configured to:

generate the subfield according to an encoding that supports only a subset of all possible combinations that excludes allocating more than fourteen spatial streams when the number of intended receivers is less than seven.

18. The first communication device of claim 13, wherein the one or more IC devices are further configured to:

generate the subfield to consist of four bits.

19. The first communication device of claim 18, wherein the one or more IC devices are further configured to:

generate the subfield according to an encoding that supports only a subset of all possible combinations that excludes allocating four spatial streams to two or more intended receivers when the number of intended receivers is three or more.

20. The first communication device of claim 11, wherein the one or more IC devices are configured to:

generate respective user fields corresponding to respective second communication devices, including generating the respective user fields to include the subfield that indicates the respective numbers of spatial streams allocated to the respective second communication devices; and generate the PHY preamble to include the respective fields arranged within the PHY preamble in an order;

wherein the respective columns of the table correspond to respective positions of user fields within the PHY preamble.

* * * * *